Feb. 26, 1952     C. B. FOWLER     2,586,806
POTENTIAL INDICATOR WITH AUDIBLE
CIRCUIT TESTING PROD
Filed May 3, 1948
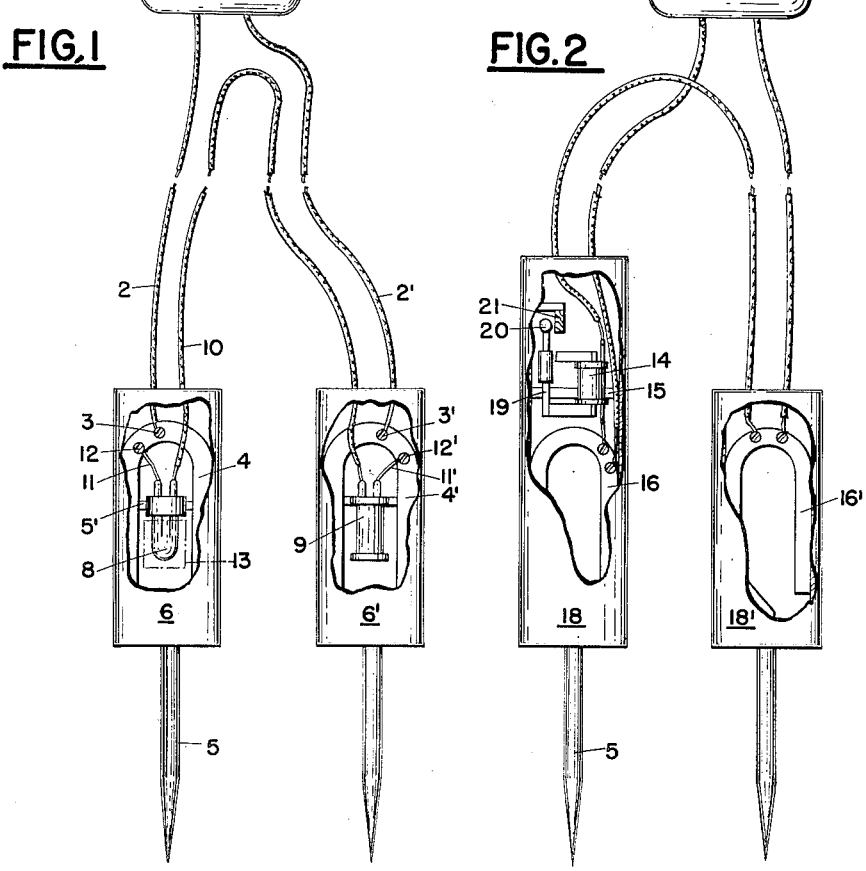
INVENTOR
CLARENCE B. FOWLER
ATTORNEY Patented Feb. 26, 1952

2,586,806

UNITED STATES PATENT OFFICE 2,586,806

POTENTIAL INDICATOR WITH AUDIBLE CIRCUIT TESTING PROD

Clarence B. Fowler, Washington, D. C.

Application May 3, 1948, Serial No. 24,896

3 Claims. (Cl. 171—95)

(Granted under the act of March 3, 1883, as amended April 30, 1928; 370 O. G. 757)

This invention relates to an electrical potential indicator, and more particularly to a portable calibrated voltage tester provided with test prods in one of which is incorporated an auxiliary device for indicating whether the voltage tester is in working condition and also to act as a substitute voltage indicator.

Portable voltage testers are subject to considerable wear and rough usage as a result of which they often become damaged, although such condition is not readily apparent from their external appearance, consequently leading the user of the apparatus to arrive at inaccurate conclusions regarding the potential values across points being tested. Thus, a no-voltage, or a low-voltage indication would be obtained by a tester which appears to be in working order whereas actually there may exist a voltage, or a higher voltage than that indicated by a low voltage reading, these errors possibly leading to injury to equipment as well as to persons.

The present invention contemplates the use of a voltage indicator connected in parallel with the testing instrument and the lack of indication on one device but not on the other instantly warns the user of the failure of the testing instrument.

Briefly, in the present invention use is made of auxiliary voltage-responsive devices, such as neon bulbs, vibrators, etc., embodied within a test prod of the testing instrument and wired parallel with it so that simultaneous indications are obtained and the failure of the testing instrument is made apparent by the indication on the auxiliary device and vice versa.

It is an object of the present invention to provide a testing instrument with an auxiliary means for indicating whether the testing instrument is functioning.

It is a further object of the present invention to provide the auxiliary means with either visual, touch-sensory or aural indicating elements.

It is an added object of the present invention to incorporate the auxiliary means into the test prods of the testing instrument Other objects and many of the attendant advantages of this invention will be readily appreciated as the same becomes better understood by reference to the following detailed description when considered in connection with the accompanying drawings in which like reference numerals designate like parts throughout the figures thereof and wherein:

Figure 1 is an elevational view of one embodiment of the invention with certain portions broken away to disclose a visual auxiliary indicating means; and Figure 2 is an elevational view of another embodiment of the invention with certain parts broken away to illustrate an aural or touch-sensory auxiliary indicating means.

The voltage tester 1 may be of commercial construction suitably calibrated for a range of voltages as well as for indicating the type and polarity of voltage in a circuit.

The tester 1 is provided with a pair of flexible insulated leads 2 and 2' which are secured to binding posts 3 and 3' anchored in substantially U-shaped shanks 4 and 4' terminating in sharp-pointed test prods 5.

Secured to the U-shaped shanks 4 and 4' of the test prods 5 are cylindrical sleeve casings 6 and 6' of insulating material such as fiber or rubber, which form the means by which the prods are handled for placing across any circuit to be tested.

Mounted between the legs of the U-shaped shank 4 is a transverse support 5' on which is secured a neon bulb 8. Mounted in a similar manner between the legs of the U-shaped shank 4' is a current limiting resistor 9.

The neon bulb 8, the current limiting resistor 9 and the U-shaped shanks 4 and 4' are connected in series by a long lead 10 and short leads 11 and 11'. The short leads 11 and 11' are connected to their respective shanks 4 and 4' at binding posts 12 and 12'. Although the leads 2 and 11, and 2' and 11', may be connected to a common post or terminal without affecting the operation of the present invention, separate terminals are desirable for minimizing the possibility of both circuits becoming open and from the standpoint of manufacturing as well as repair.

The tubular handle 6 is provided with one or more clear windows 13 of suitable material, such as clear plastic, to permit the user of the test equipment to observe the operation of the neon bulb.

In the embodiment of Figure 2, the neon bulb 8 is replaced by an electro-magnet 14 supported by a bracket 15 above the U-shaped shank 16 which is anchored to an elongated tubular casing 18. An armature 19 is mounted on the core of the electro-magnet and is provided with a clapper 20 adapted to strike against a sounding board 21 attached to the sleeve 18.

Although the neon bulb 8 and the current limiting resistor 9 are shown in separate sleeves 6 and 6', both the bulb 8 and the resistor 9 may be incorporated within a single sleeve.

It will be understood by those versed in the art, that in making a test, the prods 5 are directly applied to the uninsulated portions of the circuit to be tested; such, for example, as fuse terminals. Either the circuit of Fig. 1 using the lamp, or that of Fig. 2 using the sounder, may be used as an auxiliary potential indicator. The lamp circuit is more economical and uses less current. The sounder circuit, can, however, be made operative on lower voltages. The sounder circuit, when it receives its minimum rated current, moves the metal clapper 20 to tap sounding board 21, producing an audible sound and also vibration perceptible to a hand clasping casing 18. In testing alternating current circuits, the sounder can also vibrate substantially in unison with the frequency and by tuning the armature and its clapper to a definite frequency such frequency can be easily identified. Should one of the indicators fail to function, the other would indicate potential, if present. The probability of both indicators being inoperative at the same time, without detection of the cause, is remote.

If desired, the auxiliary potential indicator may be added to the calibrated potential indicator itself instead of to the prods. It is preferable, however, to separate them as indicated, so as to isolate possible damage and thus improve the factor of safety.

The invention described herein may be manufactured and used by or for the Government of the United States of America for governmental purposes without the payment of any royalties thereon or therefor.

The aforegoing description of the invention is to be considered illustrative and not limitative of the invention of which modifications can be made without departing from the spirit and the scope of the invention as set forth in the appended claims.

Having described the invention, what is claimed is:

1. In a voltage testing device, the combination of a pair of test prods, a tubular handle secured to each of said test prods, a vibratory means mounted in one of said tubular handles, said vibratory means having an oscillating element adapted to strike the walls of said tubular handle, means connecting said test prods and said vibratory means in series with each other, and means on each of said test prods adapted to be connected to a calibrated voltage indicator whereby the same and said vibratory means are connected in parallel across said test prods, the passage of current through said test prods being indicated by vibration of the said handle walls.

2. A voltage testing instrument comprising a calibrated potential indicator and an electromagnetic sounder connected in parallel, a pair of prods each having an insulated handle, said sounder being rigidly attached to one of the handles, and flexible insulated conductors between the handles and the calibrated indicator.

3. A voltage testing instrument comprising a calibrated potential indicator and an electromagnetic vibrator connected in parallel, a pair of test prods each having an insulated handle, said vibrator being affixed to one of the handles, and flexible insulated conductors between the handles and the calibrated indicator.

CLARENCE B. FOWLER.

REFERENCES CITED

The following references are of record in the file of this patent:

UNITED STATES PATENTS

| Number | Name | Date |
|---|---|---|
| 266,854 | Mann | Oct. 31, 1882 |
| 925,412 | Addie | June 15, 1909 |
| 1,433,264 | Fahlenberg | Oct. 24, 1922 |
| 1,615,788 | Feldkamp | Jan. 25, 1928 |
| 1,888,906 | Colosoff | Nov. 22, 1932 |
| 1,970,232 | Hady | Aug. 14, 1934 |
| 2,290,760 | Mehaffie | July 21, 1941 |
| 2,457,869 | Clemens | Jan. 4, 1949 |